Patented Feb. 27, 1934

1,949,240

UNITED STATES PATENT OFFICE 1,949,240

PRESERVATION OF OXIDIZABLE ORGANIC COMPOUNDS

Hugh Mills Bunbury and William Johnson Smith Naunton, Prestwich, and Keith William Palmer, Fartown, Huddersfield, England, assignors to Imperial Chemical Industries Limited, a corporation of Great Britain No Drawing. Application May 28, 1932, Serial No. 614,284. In Great Britain June 4, 1931

17 Claims. (Cl. 18—50)

This invention relates to the preservation of oxidizable organic compounds and more particularly to the preservation of rubber and rubber-like substances.

As is well known, many organic compounds, such as rubber and rubber-like substances, when in use, deteriorate under the influence of light and oxygen. Accordingly, it has been proposed to add a variety of substances to the rubber and rubber-like substances for the purpose of minimizing or suppressing this tendency to deteriorate.

These substances which have the power of inhibiting or retarding the action of oxygen are known collectively as anti-oxidants. However, they differ among themselves but those which are the most effective as anti-oxidants have generally proved to be unsatisfactory in use because of their liability to discolor the material to which they are added. Some of these substances have further disadvantages in that when added to rubber they interfere and retard the vulcanization process. For example, phenols which are effective anti-oxidants have a retarding action upon the vulcanization process.

The present invention has as an object to provide a new class of compounds which tend to inhibit the deterioration of rubber and rubber-like substances. A further object is to provide compounds of this type which do not have a tendency to discolor the material to which they are added. A still further object is to provide compounds of this type which will not interfere with the vulcanization process. Other and further objects are to provide a new composition of matter and to advance the art. Still other objects will appear hereinafter.

The above objects may be accomplished according to our invention in which we preserve oxidizable organic compounds, particularly rubber and rubber-like substances, from deterioration by the action of air, heat, light, and other ageing agencies by incorporating therein a small proportion of a mercaptophenol. These compounds may be represented by the formula: R—SH, wherein R stands for a substituted or unsubstituted hydroxy arylene group or by the formula:

wherein R stands for a substituted or unsubstituted arylene group.

Among the substances of this type which we have found to be particularly effective for our purpose are monothiopyrocatechol, monothiohydroquinone, and 1-mercapto-2-naphthol. In carrying the invention into practical effect a small proportion, up to about 5%, of one or more of these compounds is added to the rubber or rubber-like substances at any stage in the process of manufacture or production thereof.

In order to more clearly illustrate our invention and the preferred mode of carrying the same into effect the following examples are given in which the parts are by weight:

*Example 1.*—A rubber mix is made up having the following composition:

|  | Parts |
|---|---|
| Pale crepe | 100 |
| Zinc oxide | 10 |
| Barytes | 75 |
| Stearic acid | 1 |
| Sulfur | 3.5 |
| Diphenylguanidine (accelerator) | 0.5 |
| Monothiohydroquinone | 2.0 |

After vulcanizing this mix in the usual way a sample of the product is aged in an oxygen bomb for 2 days at 70° and 300 pounds oxygen pressure with the following results:

*Tensile strength at break in kilos per sq. cm.*

| Before ageing | After ageing |
|---|---|
| 189 | 161 |

A blank sample of the same mix but containing no monothiohydroquinone which is simultaneously treated under the same conditions is completely perished.

The material containing the anti-oxidant remains entirely free from discoloration.

*Example 2.*—The same mix employed in example 1 was used with the exception that 1-mercapto-2-naphthol was employed in place of the monothiohydroquinone and subjected to the same conditions. As a result of this treatment the resulting tensile strengths at break in kilos per sq. cm. were:

| Before ageing | After ageing |
|---|---|
| 149 | 120 |

From the above examples it will be appreciated that our new class of compounds have many advantages over prior substances used for this purpose as they do not interfere with the vulcanization process, do not discolor the rubber, and are very effective in retarding that deterioration which is due to heat and oxygen. These compounds may also be employed to inhibit the deterioration of fats, fatty oils, fatty acids and soaps.

While we have disclosed the use of certain compounds in specific proportions, in a particular mix, it is to be understood that many changes and modifications in the compounds, the proportions employed, and the substances in which they are incorporated, may be made without departing from the spirit of our invention. Accordingly, the scope of our invention is to be limited solely by the appended claims construed as broadly as is permissible in view of the prior art.

We claim:

1. A process for the preservation of rubber and rubber-like substances by incorporating therein at any convenient stage in the manufacture a small proportion, up to about 5%, of a mercaptophenol.

2. Rubber and rubber-like substances with which has been incorporated a small proportion of a mercaptophenol.

3. A process for the preservation of rubber and rubber-like substances which comprises incorporating therein a small proportion of a compound of the type: R—SH, in which R represents a hydroxy aryl nucleus.

4. A process for the preservation of rubber and rubber-like substances which comprises incorporating therein a small proportion of a compound of the type:

in which R represents a phenyl nucleus.

5. A process for the preservation of rubber and rubber-like substances which comprises incorporating therein a small proportion of a compound of the type:

in which R represents a naphthyl nucleus.

6. A process for the preservation of rubber and rubber-like substances which comprises incorporating therein a small proportion of monothiopyrocatechol.

7. A process for the preservation of rubber and rubber-like substances which comprises incorporating therein a small proportion of monothiohydroquinone.

8. A process for the preservation of rubber and rubber-like substances which comprises incorporating therein a small proportion of 1-mercapto-2-naphthol.

9. Rubber and the like having incorporated therein a small proportion of a compound of the type: R—SH, in which R represents a hydroxy aryl nucleus.

10. Rubber and the like having incorporated therein a small proportion of a compound of the type:

in which R represents a phenyl nucleus.

11. Rubber and the like having incorporated therein a small proportion of a compound of the type:

in which R represents a naphthyl nucleus.

12. A process for the preservation of rubber and rubber-like substances by incorporating therein at any convenient stage in the manufacture a small proportion, up to about 5%, of monothiopyrocatechol.

13. A process for the preservation of rubber and rubber-like substances by incorporating therein at any convenient stage in the manufacture a small proportion, up to about 5%, of monothiohydroquinone.

14. A process for the preservation of rubber and rubber-like substances by incorporating therein at any convenient stage in the manufacture a small proportion, up to about 5%, of 1-mercapto-2-naphthol.

15. Rubber and the like having incorporated therein a small proportion of monothiopyrocatechol.

16. Rubber and the like having incorporated therein a small proportion of monothiohydroquinone.

17. Rubber and the like having incorporated therein a small proportion of 1-mercapto-2-naphthol.

HUGH MILLS BUNBURY.
WILLIAM JOHNSON SMITH NAUNTON.
KEITH WILLIAM PALMER.